(12) United States Patent
Yoo et al.

(10) Patent No.: US 8,022,981 B2
(45) Date of Patent: Sep. 20, 2011

(54) APPARATUS AND METHOD FOR AUTOMATICALLY CONTROLLING POWER OF VIDEO APPLIANCE

(75) Inventors: Jang-Hee Yoo, Daejeon (KR); Sung-Uk Jung, Seoul (KR); Ki-Young Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 758 days.

(21) Appl. No.: 12/143,384

(22) Filed: Jun. 20, 2008

(65) Prior Publication Data
US 2009/0079822 A1   Mar. 26, 2009

(30) Foreign Application Priority Data
Sep. 21, 2007 (KR) .................. 10-2007-0096922

(51) Int. Cl.
*G08B 23/00* (2006.01)
(52) U.S. Cl. ......... 348/77; 340/573.7; 340/575; 348/78; 600/595
(58) Field of Classification Search ............ 348/77, 348/78; 340/573.7, 573.1, 540, 575; 600/595, 600/594
See application file for complete search history.

(56) References Cited

U.S. PATENT DOCUMENTS

| | | | |
|---|---|---|---|
| 5,243,998 A * | 9/1993 | Silverman et al. | 600/595 |
| 2009/0048538 A1* | 2/2009 | Levine et al. | 600/587 |
| 2011/0063114 A1* | 3/2011 | Ikoyan | 340/573.7 |

FOREIGN PATENT DOCUMENTS
KR  20-0297601   12/2002

* cited by examiner

*Primary Examiner* — Kenneth R Coulter
(74) *Attorney, Agent, or Firm* — Nelson Mullins Riley & Scarborough LLP; EuiHoon Lee

(57) ABSTRACT

Provided is an apparatus and method for automatically controlling power of a video appliance. The apparatus for automatically controlling power of a video appliance includes an image input unit for capturing a viewer's posture, a posture detection unit for detecting posture information from the image captured by the image input unit, a horizontal-level calculation unit for calculating a horizontal level by using the posture information detected by the posture detection unit and comparing the calculated horizontal level with a preset reference horizontal level, an alert-sound output unit for outputting an alert sound corresponding to the horizontal level compared by the horizontal-level calculation unit; and a power-signal transceiver unit for outputting a power-off signal to the video appliance corresponding to the horizontal level compared by the horizontal-level calculation unit. Accordingly, upright posture of viewers watching the video appliance can be ensured since a viewer's posture is detected and power of the video appliance is automatically controlled according to the detected posture.

15 Claims, 4 Drawing Sheets

APPARATUS AND METHOD FOR AUTOMATICALLY CONTROLLING POWER OF VIDEO APPLIANCE

CROSS-REFERENCE TO RELATED APPLICATIONS

This application claims priority under 35 U.S.C. §119 to Korean Patent Application No. 10-2007-0096922, filed on Sep. 21, 2007, the disclosure of which is incorporated herein by reference in its entirety.

BACKGROUND OF THE INVENTION

1. Field of the Invention

The present disclosure relates to an apparatus and method for automatically controlling power of a video appliance, and more particularly, to an apparatus and method for automatically controlling power of a video appliance, which can ensure upright posture in viewers by detecting a viewer's posture and automatically controlling power of the video appliance according to the detected posture.

This work was supported by the IT R&D program of MIC/IITA [2007-S-020-01, Development of Privacy Enhanced Biometric System]

2. Description of the Related Art

An increasing number of viewers are watching video contents in home through devices such as TVs, videotape recorders (VTR), digital versatile disc (DVD) players and home theaters, and demands for such video contents are rapidly increasing. Also, various kinds of video contents for infants and children are rapidly increasing and distributed, and thus it is required to provide viewing guidance to infants and children.

Particularly, it is important to ensure upright posture in infants or children who are watching video contents for a relatively long time, as well as to choose good video contents.

However, since continuous parental guidance and observation are required to ensure the upright posture, there is a need for a method or apparatus for effectively ensuring the upright posture without direct parental guidance. However, there has been no special related-art apparatus or method developed to ensure the upright posture in viewers such as infants or children, and parental guidance is still playing a main role in ensuring the upright posture.

The only method or apparatus developed for viewing limitations of viewers of video appliances such as TVs is a proximity-viewing limiting apparatus for a TV set, which includes an infrared transceiver and an ultrasonic sensor. However, this apparatus fails to recognize a viewer's posture.

SUMMARY

Therefore, an object of the present invention is to provide an apparatus and method for automatically controlling power of a video appliance, which can ensure upright viewing posture by detecting a posture of a viewer of the video appliance and automatically controlling power of the video appliance according to the detected posture.

To achieve these and other advantages and in accordance with the purpose(s) of the present invention as embodied and broadly described herein, an apparatus for automatically controlling power of a video appliance in accordance with an aspect of the present invention includes: an image input unit for capturing a viewer's posture; a posture detection unit for detecting posture information from the image captured by the image input unit; a horizontal-level calculation unit for calculating a horizontal level by using the posture information detected by the posture detection unit and comparing the calculated horizontal level with a preset reference horizontal level; an alert-sound output unit for outputting an alert sound corresponding to the horizontal level compared by the horizontal-level calculation unit; and a power-signal transceiver unit for outputting a power-off signal to the video appliance corresponding to the horizontal level compared by the horizontal-level calculation unit.

The apparatus may further include: a power unit for supplying power; a visual control unit for setting a capturing time interval of the image input unit; a storage unit for storing a program for detecting the captured image; a horizontal-level detection unit for detecting a horizontal level of the posture detection unit; and a setup unit for setting initialization of the apparatus.

To achieve these and other advantages and in accordance with the purpose(s) of the present invention, a method for automatically controlling power of a video appliance in accordance with another aspect of the present invention includes the steps of: (a) capturing a viewer's posture; (b) detecting posture information from the captured image; (c) calculating a horizontal level by using the detected posture information and comparing the calculated horizontal level with a preset threshold; (d) outputting an alert sound if the calculated horizontal level exceeds the threshold; (e) repeating the steps (a) and (b) after a predetermined time elapses since the output of the alert sound, and outputting a power-off signal to the video appliance if a calculated horizontal level exceeds the threshold.

The method may further include the step of (f) performing initialization setting of a device for image acquisition before the step (a). The initialization setting may include location setting of the device for image acquisition, horizontal level setting, zoom-level setting, horizontal-level threshold setting, remote control setting for transmission and reception of a signal with the video appliance, image-capturing interval setting, and alert-sound frequency setting.

Bilateral symmetric information of both eyes in a viewer's face or of an upper body pose, shoulders, a neck and a skin color may be detected from the captured image, and a horizontal level may be calculated based on a difference between vertical coordinate values of the detected bilateral symmetric information The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
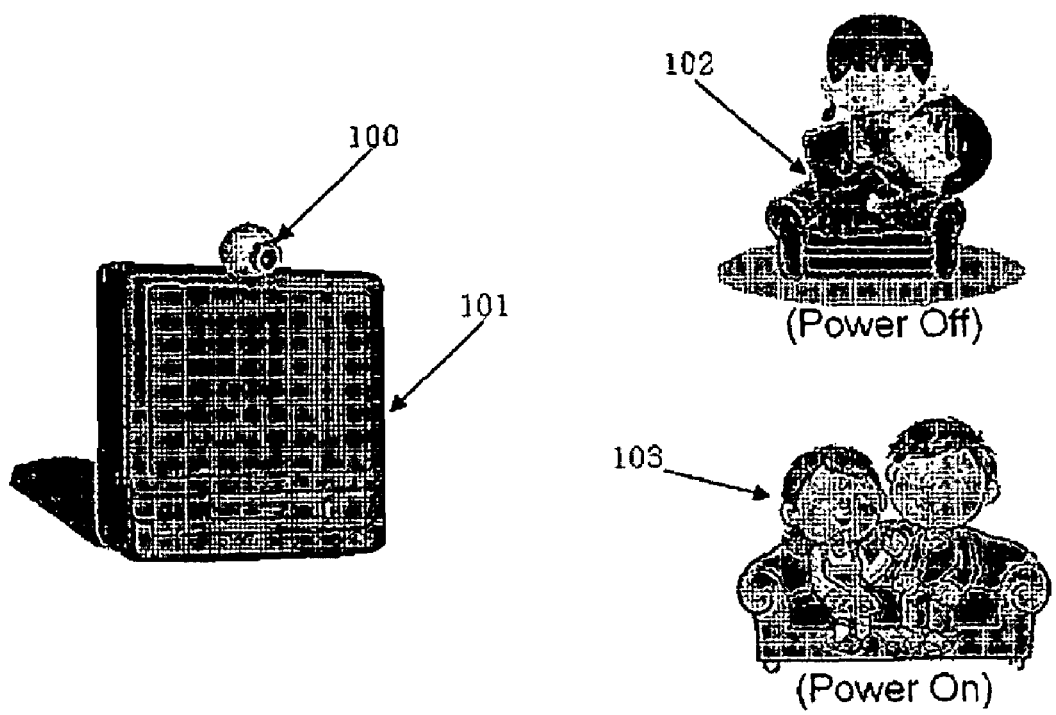
FIG. 1 illustrates power control depending on a viewer's posture recognized by an apparatus for automatically controlling power of a video appliance according to an embodiment of the present invention.
Figure 2:
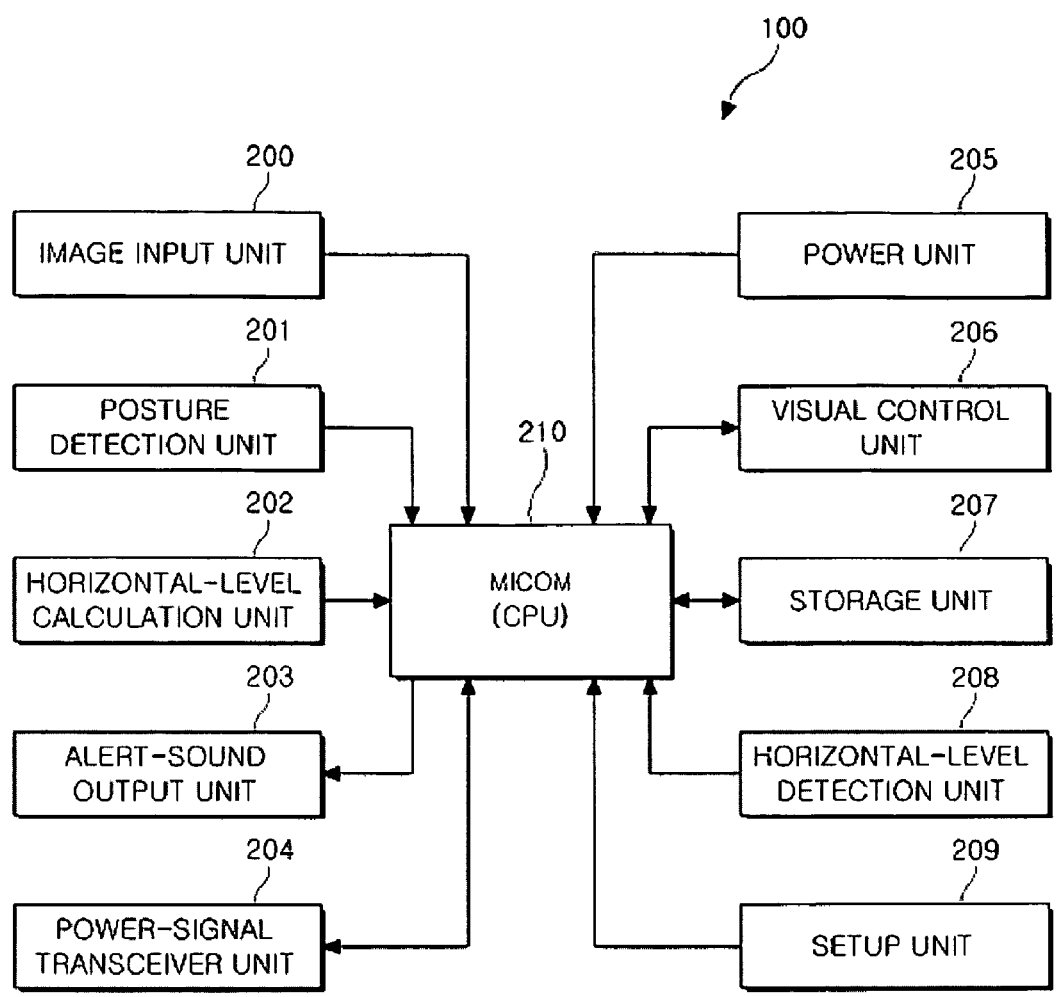
FIG. 2 is a block diagram of the apparatus for automatically controlling power of a video appliance according to the embodiment of the present invention.

FIG. 1 illustrates power control depending on a viewer's posture recognized by an apparatus for automatically controlling power of a video appliance according to an embodiment of the present invention, and FIG. 2 is a block diagram of the apparatus for automatically controlling power of a video appliance according to the embodiment of the present invention. The apparatus for automatically controlling power of the video appliance will now be described with reference to FIGS. 1 and 2.

Referring to FIG. 1, an apparatus 100 for automatically controlling power of a video appliance 101 (hereinafter, referred to as an automatic power-control apparatus 100) may be mounted in the video appliance 101 or installed as a stand-alone device. The automatic power-control apparatus 100 recognizes a viewer's posture. If the recognized posture is a slanted posture 102 such as a lying posture, the automatic power-control apparatus 100 turns off the video appliance 101 (power-off). If the recognized posture is an upright sitting posture 103 on a floor or a chair, the automatic power-control apparatus 100 maintains a power-on state of the video appliance 101.

Referring to FIG. 2, the automatic power-control apparatus 100 for the video appliance according to the current embodiment of the present invention includes an image input unit 200 for capturing a viewer's posture, a posture detection unit 201 for detecting posture information from the captured image, a horizontal-level calculation unit 202 for calculating a horizontal level by using the posture information detected by the posture detection unit 201 and comparing the calculated horizontal level with a preset reference horizontal level, an alert-sound output unit 203 for outputting an alert sound corresponding to the horizontal level compared by the horizontal-level calculation unit 202, a power-signal transceiver unit 204 for outputting a power-off signal to the video appliance corresponding to the horizontal level compared by the horizontal-level calculation unit 202, a visual control unit 206 for setting a capturing time interval of the image input unit 200, a storage unit 207 for storing a program for detecting the captured image, a horizontal-level detection unit 208 for detecting a horizontal level of the automatic power-control apparatus 100, and a setup unit 209 for setting initialization of the automatic power-control apparatus 100.

The image input unit 200 includes an interface module and a camera that captures a viewer's face or a viewer's upper body posture. The image input unit 200 has a zoom function so that it can capture the face or the upper body posture by using the zoom function according to a distance from the viewer.

The posture detection unit 201 detects posture information including locations of both eyes from the captured face image, or a bilateral symmetric degree of a pose, the shoulders, the neck, and the skin color of the viewer from the captured upper body image.

In more detail, location coordinates of both eyes are detected from the captured face image. For example, coordinates $(x_l, y_l)$ of the left eye and coordinates $(x_r, y_r)$ of the right eye may be extracted. Also, the bilateral symmetry of the pose, the shoulders, the neck and the skin color may be detected from the upper body image.

The horizontal-level calculation unit 202 calculates a horizontal level by using the detected posture information, and compares the calculated horizontal level with a preset reference horizontal level. That is, the horizontal level is calculated by a difference between y coordinate values of the coordinates $(x_l, y_l)$ of the left eye and the coordinates $(x_r, y_r)$ of the right eye. The horizontal level increases as the difference between the y coordinate values becomes smaller. The calculated horizontal level is compared with a threshold of the preset reference horizontal level, and a result of the comparison is transmitted to a micom 210. A control command may be transmitted directly to the alert-sound output unit 203 and the power-signal transceiver unit 204.

The alert-sound output unit 203 outputs an alert sound under the control of the micom 210 if the compared horizontal level exceeds the threshold of the preset reference horizontal level.

If the horizontal level continuously exceeds the threshold even after the alert-sound, the power-signal transceiver unit 204 outputs a signal for turning off the video appliance under the control of the micom 210. That is, the power-signal transceiver unit 204 transmits a remote control signal for power-off of the video appliance.

The visual control unit 206 is configured for peripheral devices for operating various devices and a posture detection interval. The visual control unit 206 sets a time interval to capture and detect a viewer's posture. The time interval may be set at an initial stage or set directly by the viewer.

The storage unit 207 stores a program for operating the automatic power-control apparatus 100, or stores a captured posture image to compare the stored posture image with a posture image that is captured at every time interval.

To detect an accurate horizontal level of the captured image, the horizontal-level detection unit 208 detects a gradient of the automatic power-control apparatus 100, particularly, the image input unit 200. Thus, the horizontal state can be maintained.

Alternatively, accuracy in posture detection is ensured by compensating the calculated horizontal level of the viewer's posture, using the gradient of the image input unit 200.

The setup unit 209 performs initialization by receiving input for location setting of the automatic power-control apparatus 100, horizontal level setting, zoom-level setting, horizontal-level threshold setting, remote control setting for transmission/reception of a signal with the video appliance, image-capturing interval setting, and alert-sound frequency setting.

Figure 3:
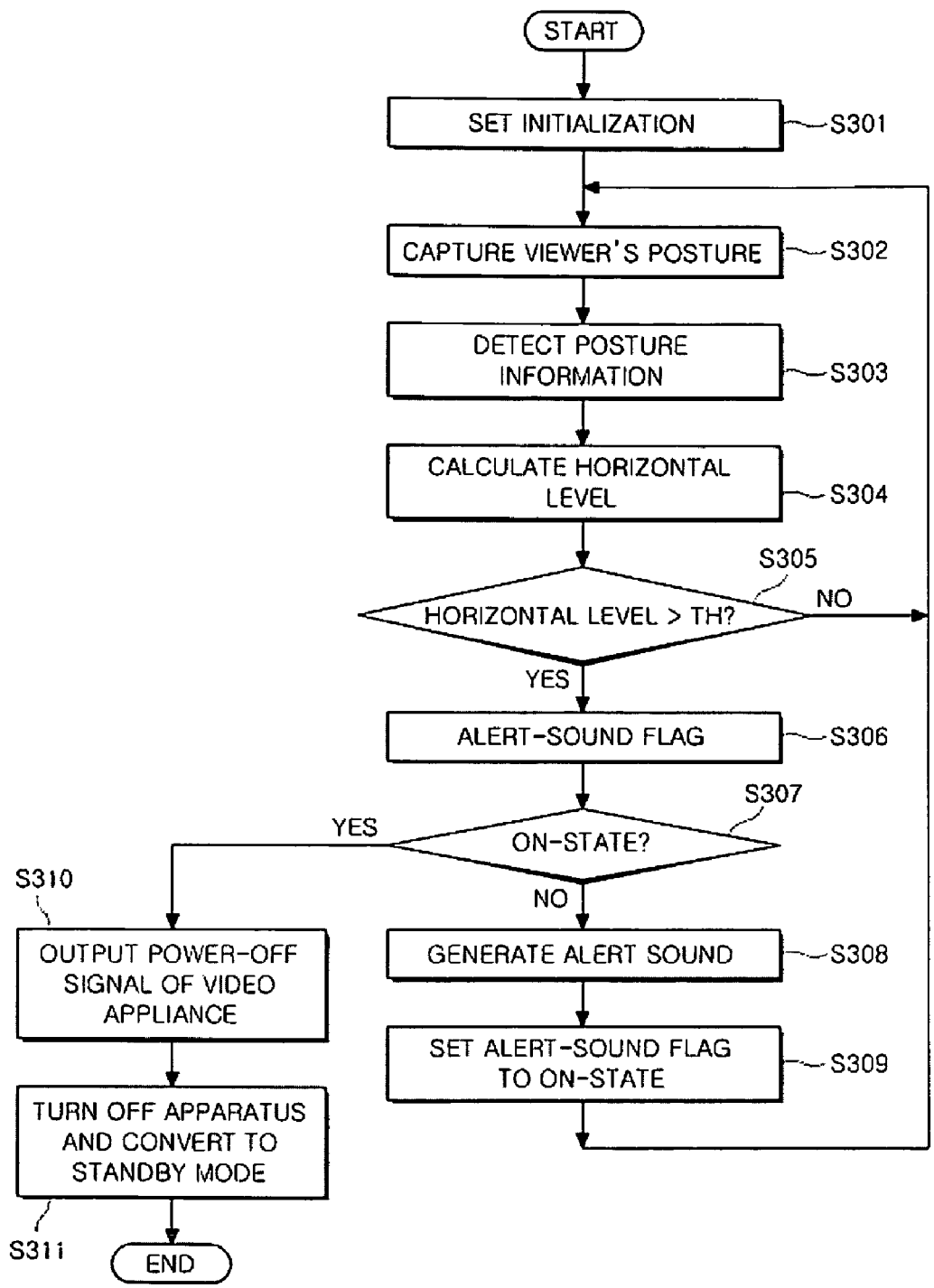
FIG. 3 is a flowchart of a method for automatically controlling power of a video appliance according to an embodiment of the present invention.

FIG. 3 is a flowchart of a method for automatically controlling power of a video appliance according to an embodiment of the present invention.

Referring to FIG. 3, in operation S301, initialization setting is performed on an image acquisition device of an automatic power-control apparatus for a video appliance. The automatic power-control apparatus may be mounted inside the video appliance or connected with the video appliance from the outside. The initialization setting includes location setting of the image acquisition device, horizontal level setting, zoom-level setting, horizontal-level threshold setting, remote control setting for transmission/reception of a signal with the video device, image capturing interval setting, and alert-sound frequency setting.

In operation S302, a viewer's posture is captured by an image input unit, and the captured image is converted into an image invulnerable to lighting change through a pre-treatment process.

In operation S303, symmetry information of the posture is detected from the converted image. The symmetry information detected from the converted image includes locations of both eyes in the face, or bilateral symmetry information of a pose of the upper body, the shoulders, the neck and the skin color.

Figure 4:
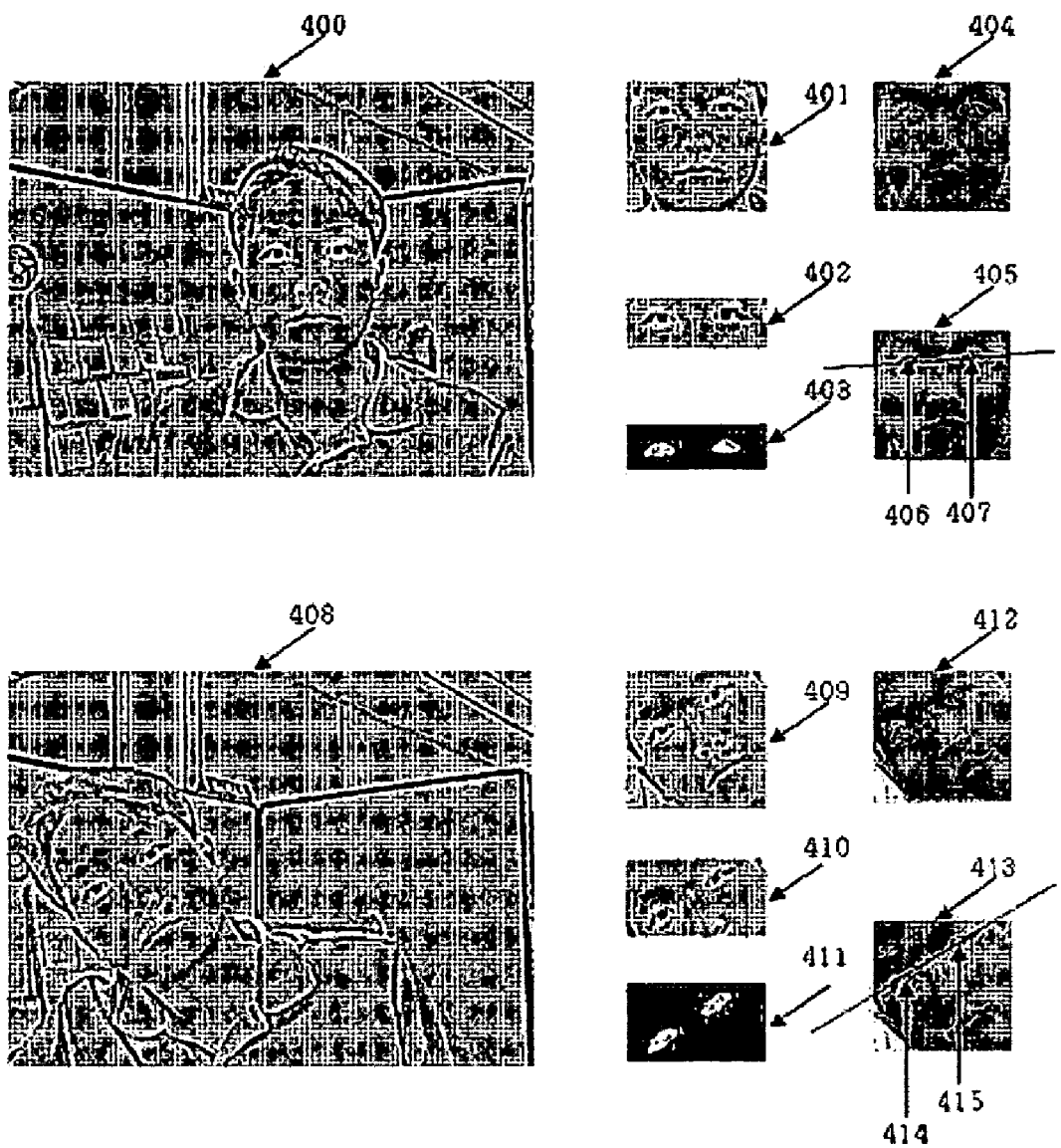
FIG. 4 illustrates one example of detecting a face area from a captured image and detecting locations of the eyes in the detected face area according to an embodiment of the present invention.

FIG. 4 illustrates one example of detecting a face area from a captured image and detecting locations of both eyes from the detected face area according to an embodiment of the present invention. As shown in FIG. 4, face areas 401 and 409 are detected from captured images 400 and 408, respectively. Locations of both eyes 402 are detected in the detected face area 401 of the captured image 400, and locations of both eyes 410 are detected in the face area 409 of the captured image 408. The locations of both eyes 402 undergo a binary process 403, and thus accurate locations of both eyes 404 are detected from an original image. Also, the locations of both eyes 410 also undergo a binary process 411, and thus accurate locations of both eyes 413 are detected from an original image. In the binary processes 403 and 411, a received gray scale input image is converted into a binary image.

In the detected locations of both eyes 404 and 413, horizontal levels corresponding to y coordinate values are detected from coordinates $(x_l, y_l)$ of the left eye and coordinates $(x_r, y_r)$ of the right eye by using x, y coordinates 406, 407, 414 and 415.

In the upper body image, the horizontal level may be detected by using the bilateral symmetry information of the pose, the shoulders, the neck and the skin color.

In operation S304, the horizontal level is calculated by using the detected symmetry information. In more detail, the horizontal level is calculated by a difference $(|y_r-y_l|)$ between the y coordinate value $y_l$ of the coordinates $(x_l, y_l)$ of the left eye and the y coordinate value $y_r$ of the coordinates $(x_r, y_r)$ of the right eye. And, the horizontal level increases as the difference $(|y_r-y_l|)$ decreases.

In operation S305, the calculated horizontal level is compared with a preset reference horizontal level so that whether the compared result value exceeds the threshold is determined. Herein, the threshold may be preset in initializing the devices or directly set by the viewer.

The calculated horizontal level is compared with the threshold. The threshold may be set previously at the time of initialization of the image acquisition device, or may be set directly by a user.

If the compared result value of the horizontal level is in close proximity to the threshold and exceeds the threshold in the operation S305, a setting state of an alert-sound flag is determined in operation S306. In operation S307, the alert-sound flag is in an on-state. If the alert-sound flag is not in an on-state in operation S307, the alert-sound is generated in operation S308. Herein, a case when the alert-sound flag is not in an on-state denotes that the alert-sound for the viewer has not been occurred at all.

After the alert sound is generated, the alert-sound flag state is set to an on-state in operation S309.

While a predetermined time elapses after the alert sound, the operations S302 through S307 again proceed.

Meanwhile, if the alert-sound flag is in an on-state in operation S307, a power-off signal is transmitted to the video alliance in operation S310. That is, if the alert-sound flag is in an on-state, it is recognized for the alert-sound to have been already generated before so that the power-off signal is transmitted to the video appliance.

After the power-off signal is transmitted, the automatic power-control apparatus for the video appliance is also turned off and switched to a standby mode in operation S311.

If the calculated horizontal level does not exceed the threshold as a result of the determination in operation S305, a viewer's posture is captured again to detect a horizontal level and thereafter the detected horizontal level is compared with the threshold. That is, the viewer's posture is captured in real-time corresponding to a time interval set at the initialization stage to thereby detect the horizontal level, and whether the horizontal level exceeds the threshold or not is determined. Herein, according to a result of the determination, an alert sound is generated or otherwise a horizontal level is detected in real-time.

Power of the video appliance is controlled on the basis of the threshold of the preset reference horizontal level according to a viewer's habit or location, so that upright posture in viewers such as infants and children can be effectively controlled and ensured without direct parental guidance.

Although not shown, the threshold of the horizontal level may be dynamically updated depending on the viewer's habit or viewing location, using collected posture information. The dynamic update of the threshold of the horizontal level may be performed by the horizontal-level calculation unit 202 or the micom 210.

The apparatus and method for automatically controlling power of a video appliance according to the embodiments of the present invention can ensure upright viewing posture by detecting a posture of a viewer who is watching the video appliance and automatically controlling power of the video appliance according to the detected posture.

Also, a threshold of a horizontal level may be set differently depending on a habit or a viewing location of the viewer at an initial stage, so that upright posture in viewers such as infants and children can be effectively controlled and ensured without direct parental guidance.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for automatically controlling power of a video appliance, the apparatus comprising:
   an image input unit for capturing a viewer's posture;
   a posture detection unit for detecting posture information from the image captured by the image input unit;
   a horizontal-level calculation unit for calculating a horizontal level by using the posture information detected by the posture detection unit, and comparing the calculated horizontal level with a preset reference horizontal level;
   an alert-sound output unit for outputting an alert sound corresponding to the horizontal level compared by the horizontal-level calculation unit; and
   a power-signal transceiver unit for outputting a power-off signal to the video appliance corresponding to the horizontal level compared by the horizontal-level calculation unit.

2. The apparatus of claim 1, further comprising:
a power unit for supplying power;
a visual control unit for setting a capturing time interval of the image input unit;
a storage unit for storing a program for detecting the captured image;
a horizontal-level detection unit for detecting a horizontal level of the posture detection unit; and
a setup unit for setting initialization of the apparatus.

3. The apparatus of claim 1, wherein the posture detection unit detects bilateral symmetry information of a viewer's face, or of an upper body pose, shoulders, a neck and a skin color of the viewer from the captured image.

4. The apparatus of claim 3, wherein the posture detection unit detects locations of both eyes in the viewer's face.

5. The apparatus of claim 1, wherein the horizontal-level calculation unit calculates a horizontal level by using a vertical coordinate value of each symmetric point from the posture information.

6. The apparatus of claim 1, wherein the alert-sound output unit outputs an alert sound if the compared horizontal level exceeds a threshold of the preset reference horizontal level.

7. A method for automatically controlling power of a video appliance, the method comprising:
capturing an image of a viewer's posture;
detecting posture information from the captured image;
calculating a horizontal level on the basis of the detected posture information and comparing the calculated horizontal level with a preset reference horizontal level to determine whether the result value of the comparison exceeds a preset threshold;
outputting an alert sound if the result value of the comparison exceeds the preset threshold as a result of determining whether the result value of the comparison exceeds a preset threshold; and
outputting a power-off signal to the video appliance if the result value of the comparison exceeds the preset threshold after a predetermined time elapses since the output of the alert sound.

8. The method of claim 7, further comprising:
performing initialization setting of a device for image acquisition before the capturing operation.

9. The method of claim 8, wherein the initialization setting comprises location setting of the device for image acquisition, horizontal level setting, zoom-level setting, horizontal-level threshold setting, remote control setting for transmission and reception of a signal with the video appliance, image-capturing interval setting, and alert-sound frequency setting.

10. The method of claim 7, wherein the detecting operation comprises:
detecting, from the captured image, bilateral symmetry information of a viewer's face or of an upper body pose, shoulders, a neck and a skin color of the viewer.

11. The method of claim 7, wherein the calculating operation comprises:
calculating a posture horizontal level from the posture information by using a vertical coordinate value of each symmetric point; and
comparing the posture horizontal level with the preset reference horizontal level to update the threshold according to a result of the comparison.

12. The method of claim 11, wherein the updating operation comprises:
extracting a habit and a posture of the viewer; and
updating the threshold according to a result of the extraction.

13. The method of claim 7, further comprises:
outputting the power-off signal to the video appliance and switching the video appliance to a power standby mode.

14. The method of claim 7, further comprises:
repeating the capturing operation, the detecting operation, and the calculating operation at every set time interval if the result value of the comparison does not exceed the threshold as a result of the determination.

15. The method of claim 7 wherein the power-off signal output to the video appliance is an infrared signal of a remote control.

* * * * *